Oct. 6, 1970 J. V. RILEY 3,533,021

SONIC DELAY LINE

Original Filed Dec. 29, 1964 3 Sheets-Sheet 1

INVENTOR
JOSEPH V. RILEY

BY Paul M. Brannen

AGENT

United States Patent Office 3,533,021

Patented Oct. 6, 1970

3,533,021

SONIC DELAY LINE

Joseph V. Riley, Vestal, N.Y., assignor to International Business Machines Corporation, Armonk, N.Y., a corporation of New York Original application Dec. 29, 1964, Ser. No. 421,975. Divided and this application Apr. 22, 1969, Ser. No. 818,315

Int. Cl. H03h 7/30

U.S. Cl. 333—30 1 Claim

ABSTRACT OF THE DISCLOSURE

An improved sonic delay line operating in the torsional mode with magnetostrictive transducers, the gain being maximized or controlled as a result of the magnetostrictive drive tape having a predetermined tension, changes in tension due to temperature variations being minimized by the assembly support having a coefficient of expansion similar to the tapes. The tapes may also be annealed under predetermined optimum tension conditions.

This invention relates to an improved sonic delay line of the type which operates in the torsional mode and has magnetostrictive input or output transducers.

This application is a division of a patent application Ser. No. 421,975, Pat. No. 3,460,243, filed on Dec. 29, 1964, for the same inventor and assigned to the same assignee as the present application.

More particularly, the delay line in the preferred embodiment comprises a pair of parallel metallic tapes or wires of magnetostrictive material secured to diametrically opposite portions on the circumference of a delay line wire. Transducing coils are wound about the two tapes in opposite sense and a biasing magnet is provided. Pulsing the coils causes one of the tapes to expand and the other to contract magnetostrictively, and the push-pull effect at the delay line wire produced by the longitudinal stress waves twists it and launches a torsional stress wave or pulse which travels down the wire at the speed of sound. At the output end, the converse effect takes place, i.e., longitudinal stress in the tapes in the output transducer causes the permeability of the tapes to change, and the change in permeability creates a flux change in the receiving coils which induces a voltage representing the output of the delay line.

An object of the invention is to provide a generally improved and more satisfactory torsional mode wire delay line by improving the performance of its magnetostrictive input and/or output transducers.

Another object is to control or maximize the gain of a torsional mode sonic delay line to improve its temperature sensitivity and to improve the manufacturing yield of the line, especially those having a delay of five milliseconds or more.

The foregoing and other objects, features and advantages of the invention will be apparent from the following more particular description of a preferred embodiment of the invention, as illustrated in the accompanying drawings wherein.

Figure 5:
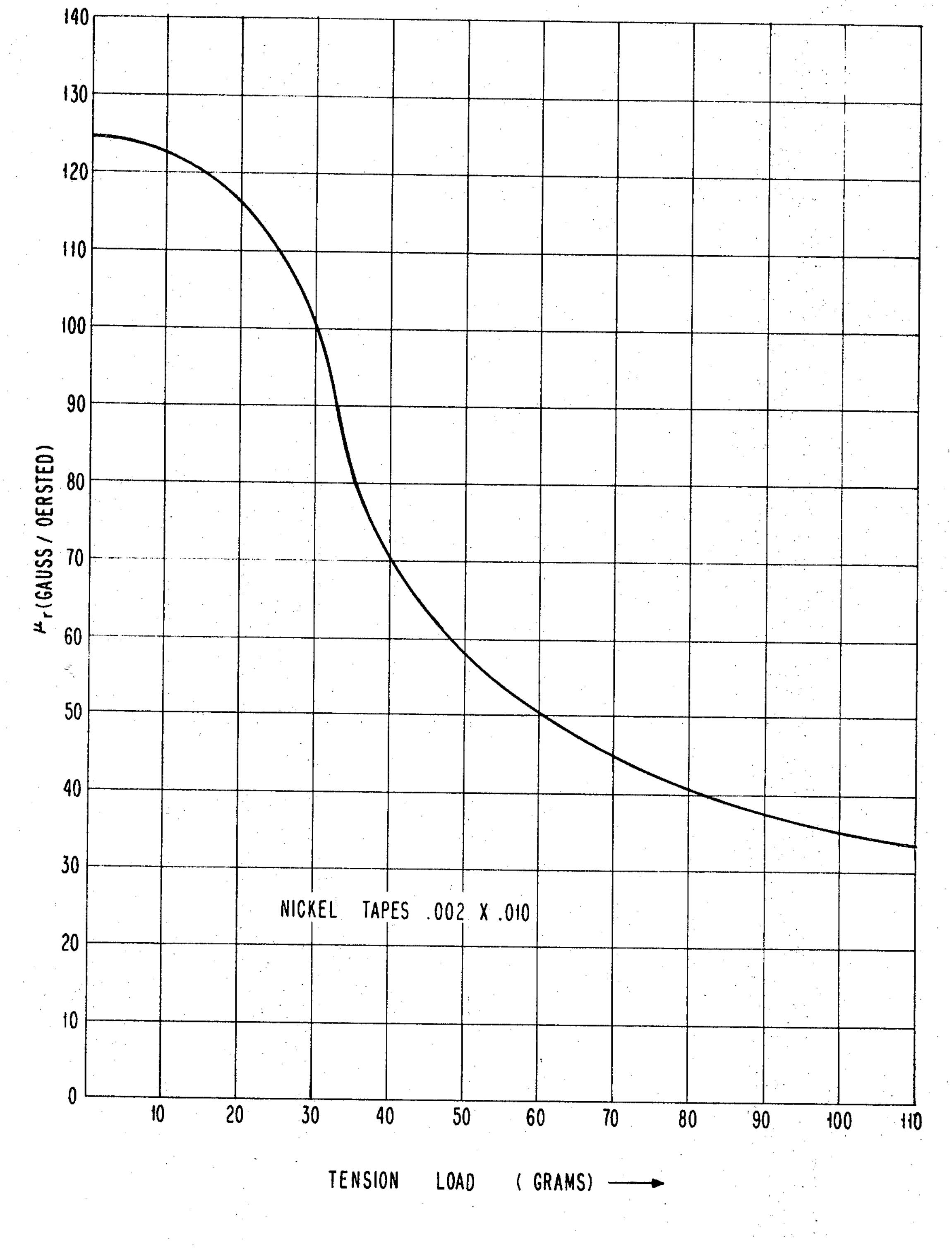
Figure 6:
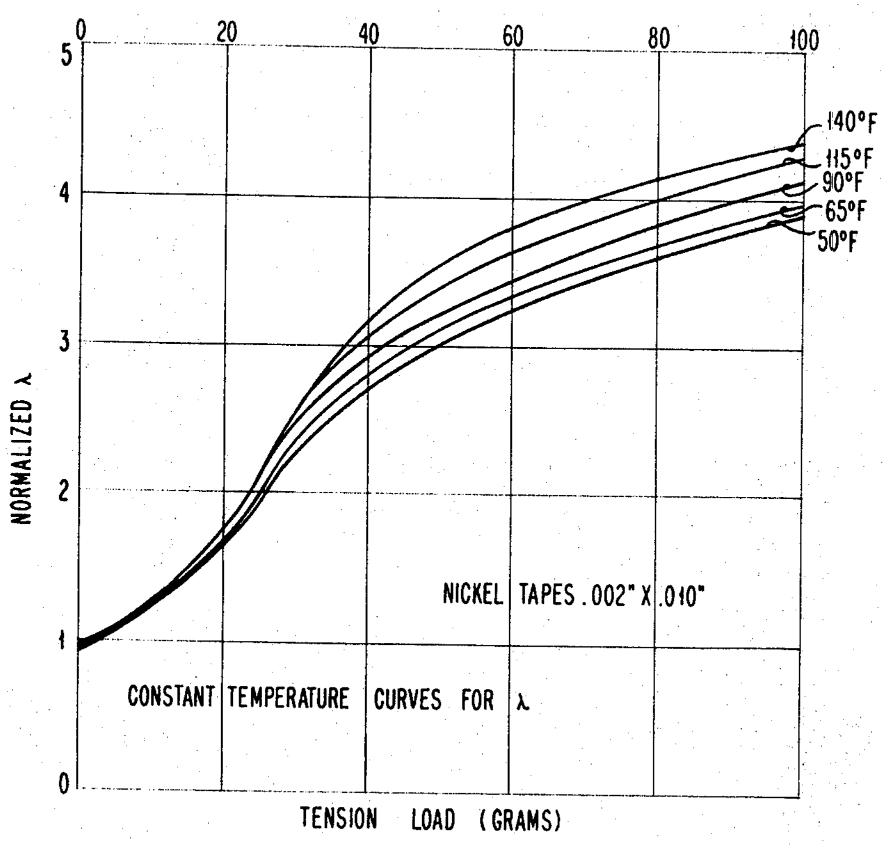
Figure 7:
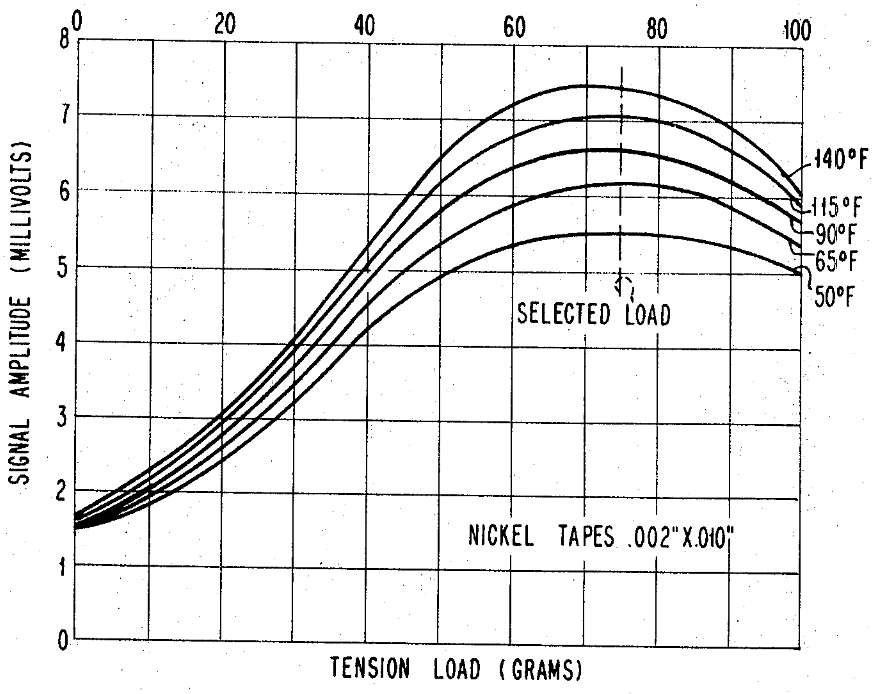

FIGS. 5, 6, and 7 are graphs relating to the effect of the tension on the tapes on the gain.

Figure 1:
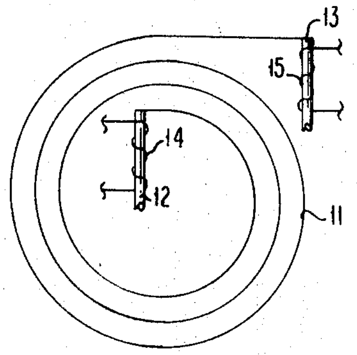
FIG. 1 is an elementary schematic of a sonic delay line of the type to which the invention pertains.

The torsional mode sonic delay line shown diagrammatically in FIG. 1 comprises essentially a delay medium in the form of a helically wound wire or rod 11 at either end of which are connected tangentially magnetostrictive tapes or wires 12 and 13 coupled respectively to an input transducing coil 14 and an output transducing coil 15. At the input transducer electrical pulses are converted into longitudinal stress waves which travel along the tape and are converted to torsional stress waves at the mode transformer where the tape is attached to the delay line wire. The torsional stress waves propagate along the delay line wire at the speed of sound, the length of the wire approximately determining the amount of delay. At the output end of the delay line, the torsional stress waves are converted to longitudinal stress waves which travel along the tape and are converted back to electrical energy at the output transducer.

Figure 2:
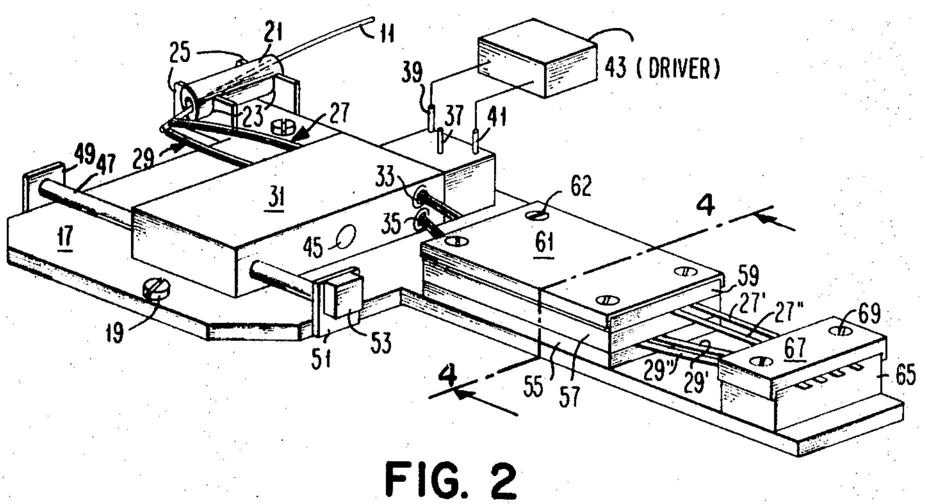
FIG. 2 is a perspective view of one of the transducer areas at one end of the delay line.
Figure 3:
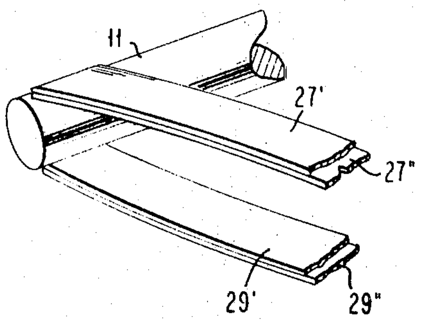
FIG. 3 is an enlarged view of a portion of FIG. 2 showing the connection of the metallic tapes to the delay line wire.

Referring to FIGS. 2 and 3, the magnetostrictive transducer to which the invention pertains is assembled on a flat mounting bracket 17 which is secured by fasteners 19 to the floor of a case not here shown for the entire delay line. The delay line wire 11 has a portion near the end encased in a plastic sleeve 21 and pushed down into aligned notches 23 in a pair of spaced parallel legs 25 bent upwardly from a forward corner of the bracket. The wire 11 is heat treated to have a low temperature coefficient and although the material of which the wire is made has magnetostrictive properties, the operation of the entire delay line is not dependent on the magnetostriction of the wire. Metallic tapes 27 and 29 are secured as by welding to the end of wire 11 at diametrically opposite points on the circumference of the wire and extending parallel to one another. The tapes 27 and 29 are made of a suitable positive or negative magnetostrictive material. Preferably tapes of "A" nickel having negative magnetostriction are used, i.e., the length of a portion of the tape in a magnetic field decreases when the strength of the field is increased. Each tape may be made up of two or more sections or laminations unconnected with one another except at the weld, but whose effect is additive and substantially simultaneous. Thus, in the illustrated form, tape 27 is composed of two superimposed sections 27′ and 27″ and tape 29 is composed of sections 29′ and 29″.

A bobbin block 31 made of insulating material such as plastic is fastened to a central portion of the bracket 17 and contains two coils 33 and 35 through which the tapes 27 and 29 pass respectively. Coils 33 and 35 are wired to establish oppositely directed magnetic fields. To this end, unlike ends of the coils are connected in series at binding post 37, while the other ends of the coils are connected to inputs 39 and 41. A driver circuit 43 of any suitable type is connected to the posts 39 and 41. In the case that the transducer is being used as an output transducer, the posts 39 and 41 are connected to an amplifier and detector for shaping the output pulse. A bias magnet 45 is mounted in the bobbin block in proximity to the coils 33 and 35 to provide a relatively large constant field acting on the portions of the tapes within the coils so that the transducer operates in the linear portion of the H vs. $\lambda$ (magnetic field vs. magnetostrictive constant or strain) curve wherein small changes in the field provide for large changes in magnetostriction.

Since the energizing coils produce fields in opposite directions when the driver 43 introduces an input pulse, there is a small decrease in the field applied to the portion of one of the tapes 27 and 29 within its respective coil and a small increase in the field applied to a corresponding portion of the other tape. Thus, one of the nickel tapes is caused to contract magnetostrictively while the other has a magnetostrictive expansion. The contraction results in a longitudinal stress wave or sonic rarefaction which travels along the tape in either direction. Similarly, the expansion in the other tape results in a longitudinal sonic compression. Both stress waves arrive at the junction between the tapes and the wire 11 at the same time, and by a push-pull action momentarily twist the wire to launch a torsional stress wave. It is seen that the weld between the tapes 27 and 29 and the wire 11 serves as a mode junction between the longitudinal stress waves developed in the tapes in response to pulsing the energizing coils 33 and 35 and the torsional stress waves in the wire.

A portion of the total delay provided by the entire delay line occurs in the magnetostrictive tapes, and for this reason the position of the energizing coils is made adjustable to provide an adjustment in the delay. To this end, the bobbin block 31 is threaded on a long screw 47 extending between bent up lugs 49 and 51 on bracket 17. By loosening the tightening nut 53, the screw can be rotated until the position of the coils and the length of tape through which the longitudinal stress wave travels is such as to provide the required amount of delay.

Figure 4:
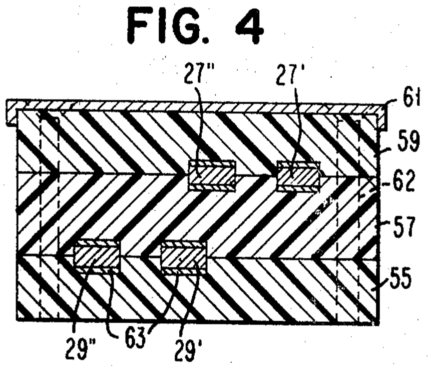
FIG. 4 is a cross-sectional view taken on line 4—4 of FIG. 2.

The longitudinal stress waves resulting from the magnetostrictive effect travel along the tapes 27 and 29 in both directions, in the direction away from the wire 11 as well as toward it. The stress waves traveling away from the wire are damped out to prevent unwanted reflections. It is also desirable to electrically ground the ends of the tapes. Damping is provided by securing free end portions of the tapes in a suitable damping material such as plastic, for instance vinyl plasticol. Thus, three plastic pads 55, 57, and 59 are piled one atop the other on a rearward extension of bracket 17 with the tapes 27', 27'' between the top-most pair of pads and the tapes 29', 29'' between the bottom-most pads. A flanged cover 61 held down by screws 62 retains the assembly in place. As shown in FIG. 4, each of the pads is desirably provided with adhered strips 63 of polytetrafluoroethylene to damp out the high frequency content. To ground the tapes, they are engaged between a suitable grounding material 65 such as hard neoprene and a cover plate 67, the assembly being fastened by screws 69 to the end of bracket 17 at a position spaced from the damping assembly.

The operation of the delay line will be reviewed briefly by describing the operation of the assembly shown in FIG. 2 when being used at the output end. The torsional stress wave advancing along the wire 11 arrives at the mode junction (FIG. 3) wherein a push-pull action sets up longitudinal stress waves in the tapes 27', 27'' and 29', 29''. In the portion of the tape within the coils 33 and 35, the Villari or reverse magnetostrictive effect takes place and causes a change in magnetic induction or permeability. The change in permeability produces a flux change in the coils, which are now receiving coils, and a voltage is induced in the coils which represents the output of the delay line. Reflections of the stress waves do not occur due to the action of damping pads 55, 57, and 59.

In accordance with the invention, the gain of the sonic delay line is maximized or improved or controlled by assembling the tapes 27 and 29 with a predetermined optimum tension. For example, for a delay line in which nickel tapes are used each having a cross-section of $.002 \times .010$ in.$^2$, a tension of 75 grams on the tapes has been determined to maximize the gain for an ambient temperature range of 50°–140° F. Since delay lines are normally used under uncontrolled temperature conditions and are designed for service in the range of about 50° to 140° F., it is seen that there can be a change in tension over the temperature range resulting from different coefficients of expansion if the metals from which the tapes and bracket 17 are made are dissimilar in this respect. In the preferred embodiment wherein the tapes 27, 29 are of "A" nickel, it has been found that the bracket may be made of relatively inexpensive stanless steel. The coefficients of expansion of nickel and stainless steel are not the same but are close enough (7.11 microin./in./° F. as compared to 9.3 microin./in./° F.) to yield acceptable performance in a variety of delay lines providing different delays A third factor involved in controlling or maximizing the gain is to anneal the magnetostrictive tapes under predetermined optimum conditions. Either torch annealing or current annealing can be employed, although in opmizing the gain of a particular delay line, one may be found to be more satisfactory than the other.

Further explanation will be made of the factors of adjusting the tension of the tapes and of annealing the tapes. One approach at explaining why the gain is improved in these ways is to examine the expression for the gain of a sonic delay line given by R. C. Williams (see "Theory of Magnetostrictive Delay Line for Pulse and Continuous Wave Transmission," PGUE–7, February 1959) as follows:

$$|G| = \frac{4\pi\lambda^2\mu_r}{E} \cdot \frac{\eta^2}{\eta_1} \cdot \frac{\sin^2 \Omega}{\Omega}$$

This formula assumes operation in the straight line portion of the H vs. λ curve. The term $\eta^2/\eta_1$ is governed by the driver and receiver requirements and is not considered here. The term $$\frac{\sin^2 \Omega}{\Omega}$$

determines the frequency response and is likewise not considered. For a particular delay line these can be considered to be constants. Thus the term $$\frac{4\pi\lambda^2\mu_r}{E}$$

dominates the gain or the output signal, where

λ=magnetostriction constant or strain
$\mu_r$=reversible permeability
E=Young's Modulus Although the gain of the delay line is a function of 1/E, the change in Young's Modulus was found not to be significant over the ambient operating temperature range and/or the range of tension that the magnetostrictive tapes are being subjected to. It can be concluded that the product $\lambda^2\mu_r$ has a dominating effect on the gain since the other terms can be considered as constant for the purpose of this study. The effect of tension and annealing conditions on the reversible permeability $\mu_r$ and on the magnetostriction constant λ will be reviewed.

The reversible permeability $\mu_r$ can be measured conveniently using a hysterisigraph, and was measured for a large number of samples under various stress (i.e., tension) and anneal conditions. Nickel tapes $.002'' \times .010''$ in cross section having an indeterminant length were used. The bias magnet has a field of about 15 oersteds and the input current pulse generated a field of about 10 oersteds. In one set of tests the load was varied from 0–100–0 grams and tapes annealed under various annealing conditions were used. No matter what the annealing condition, it was shown conclusively that the reverse permeability $\mu_r$ decreases with increased tension. A curve of the general shape shown in FIG. 5 results, wherein it is noted that the rate of decrease is initially quite steep but becomes less steep at the higher tensions of about 40–100 grams.

FIG. 6 shows a family of curves of the normalized magnetostriction constant λ versus tension in grams taken at the temperatures between 50°–140° F. indicated on each curve. Here it can be seen that as the tension increases, there is an initial steep rise of λ which flattens out and increases less rapidly in the range 40 to 100 grams. To obtain the normalized λ, the tension was held constant at various values between 0–100 grams and the amplitude was measured in millivolts. $\lambda^2$ was obtained in a normalized form by dividing the results by $\mu_r$ since the other terms in the gain equation can be assumed to be constant.

(This is possible since there is a definite $\mu_r$ associated with each value of tension.) From this the normalized $\lambda$ is obtained. FIG. 6 shows these values normalized with respect to one.

Another set of data was taken to obtain the family of curves shown in FIG. 7, wherein the amplitude of the output pulse in millivolts is plotted versus tension in grams, each curve being taken at the indicated temperature. These curves show a belly in the area of 50–100 grams. To maximize the gain, an optimum load of 75 grams is selected since this is at about the midpoint of the family of curves. The shape of the FIG. 7 curves is explainable in terms of the previous discussion of FIGS. 5 and 6. Recalling that gain is proportional to the product $\lambda^2\mu_r$, it is observed that in the range of 30–70 grams $\lambda^2$ has a sharp rise while over this same range $\mu_r$ is decreasing but not at the same rate. A point is reached where the decrease in $\mu_r$ becomes greater than the increase in $\lambda^2$, causing a downturn in the product of the two. It is of particular advantage that the relatively flat belly in the FIG. 7 curves extends over a fairliy large range of 50–100 grams, as this means that the need to hold over long periods of usage the optimum tension at which the tapes are assembled while being manufactured is not so critical. As another example of the desirability for controlling the gain, for a delay line in which large output signals are not a requirement and temperature sensitivity is the controlling factor, mechanically biasing the tapes with about a 30 gram load would be selected since this load provides a sufficient output for a given application and at the same time minimizes the temeperature sensitivity. It has previously been mentioned that the bracket 17 may be made of stainless steel since it has a coefficient of expansion only slightly greater than that of the nickel tapes. Stainless steel is chosen from a cost consideration. To decrease the temperature sensitivity it is preferable to make the bracket from a material having a coefficient of expansion negative with respect to the material of which the tapes are made. This tends to decrease the tension with increasing temperature, and decreased tension gives better temperature sensitivity. In the claims the term "similar coefficients of expansion" is intended to cover the range of having identical coefficients or somewhat more or less according to these considerations.

As was previously pointed out, annealing the magnetostrictive tapes under predetermined optimum conditions is also a factor in improving or controlling the gain of the sonic delay line. It is shown in the following table of data where $\mu_r$ was measured on a hysterisigraph that $\mu_r$ varies according to the annealing conditions. Data was taken with the tape under no load conditions and under a load of 70 grams. For current annealing various currents and times are given, and for torch annealing a flame was passed under the tape at a uniform rate of speed of about two inches per second, the metal becoming cherry red.

TABLE OF $\mu_r$

| Sample Number | I (amps) | Time (sec.) | $\mu_r$ (NL) | $\mu_r$ (70 g. load) |
|---|---|---|---|---|
| 1 | 1.25 | 30 | 6.0 | 14.0 |
| 2 | 1.50 | 15 | 46.6 | 33.3 |
| 3 | 1.50 | 30 | 43.4 | 28.5 |
| 4 | 1.50 | 45 | 30.7 | 29.0 |
| 5 | 1.70 | 15 | 100.0 | 38.4 |
| 6 | 1.70 | 30 | 73.1 | 30.8 |
| 7 | 1.70 | 45 | 30.7 | 29.0 |
| 8 | 1.70 | 60 | 85.7 | 31.2 |
| 9 | 1.90 | 15 | 50.0 | 37.5 |
| 10 | 1.90 | 30 | 82.0 | 41.6 |
| 11 | 1.90 | 45 | 62.5 | 31.6 |
| 12 | 1.90 | 60 | 81.6 | 33.3 |
| 13 | Torch (1 pass) | | 128.0 | 66.6 |

Since gain is proportional to $\mu_r$, the optimum annealing conditions are those which give high values of $\mu_r$. This must, of course, be weighed in the balance with the optimum tension under which the tapes are assembled since it has been shown that increasing the tension causes a decrease in $\mu_r$. For this set of data it appears that torch annealing is preferable for tapes loaded at about 75 grams to obtain the maximum gain although good results are obtainable under the alternate procedure of current annealing at 1.90 amps for 30 seconds. Not all combinations of current and time for current annealing have been investigated, particularly since the preferred assembly technique to be discussed later makes torch annealing more convenient. It is possible that more thorough investigation for a particular magnetostrictive tape may prove certain current annealing conditions to be superior to torch annealing. It is clear, however, that generally speaking preselected annealing conditions are a factor in controlling or maximizing the gain. A rudimentary explanation for this may be that the tape is subjected during manufacture to cold working. Annealing the tape restores the crystal structure to an undeformed stress-free state and may cause grain growth.

The method of assembly of the magnetostrictive tapes and coil transducer to the delay line wire involves initially fastening the bracket 17 to the base of the case of the delay line (not here shown), assembling the bobbin 31 and long screw 47 onto the bracket, and placing the lower damping pad 55 onto the bracket in the proper place. Two unannealed nickel tapes are superimposed upon one another and bent over once through 180° about the end of a preselected length of delay line wire which has been annealed on an 11″ mandrel. The tapes are welded to the wire at diametrically opposite points and the excess loop portion stoned off to provide an assembly as shown in FIG. 3 wherein the four tape sections 27′, 27″ and 29′, 29″ extend tangentially from the periphery of the wire. The tapes are now torch annealed by attaching small weights of about 6 grams to the tapes to draw them taut and passing the torch beneath the tapes at a steady rate to heat all portions to about the same temperature. In torch annealing various samples, care is taken to approximately duplicate the predetermined conditions which have been found to control or maximize the gain in the desired manner. The plastic sleeve 21 is drawn into place and the wire is inserted down into the notches 23 and the tapes 27′, 27″ threaded axially through the coil 33 and the tapes 29′, 29″ through the coil 35. The lower tapes 29′, 29″ are separated and laid on the plastic damping pad 55, the pad 57 is piled on top, and then the upper tapes 27′, 27″ are separated and the top pad 59 is added. Each tape in weighted with a preselected load to provide the predetermined tension selected to control or maximize the gain in the desired manner. To maximize the gain, a load of 75 grams is used. The damping assembly cover 61 is added and the screws 69 tightening down to clamp the free ends of the tapes in the damping assembly. At a later point the ground material 65 and cover 67 are assembled with the extreme free ends of the tapes between to provide additional clamping force to hold the predetermined tension.

The two basic techniques of maximizing or controlling the gain of a coil operated magnetostrictive tape sonic delay line which have been discussed (1) assembling the tapes under a predetermined tension and using a metallic mounting bracket having a coefficient of expansion similar to that of the tapes; and (2) annealing the tapes under predetermined conditions, operate independently of one another. That is to say, adoption of one technique improves or controls the gain but using both techniques gives an even more satisfactory gain. The use of a predetermined optimum tension on the tapes is the most significant factor, however.

By maximizing the gain of a sonic delay line having a magnetostrictive tape and coil transducer in the manner herein taught, delay lines of this type can be built having at least a five millisecond delay and which operate at one megacycle. The manufacturing yield for this type of line is much improved inasmuch as a substantially higher percentage of delay lines pass the minimum specifications. Prior to the invention, relatively short (two millisecond delay) lines operating at 500 kilocycles or one megacycle could be built with satisfactory performance and yield, but the manufacturing yield of longer lines of the same type was low. Of course, if need be the invention can be applied to relatively short delay lines having less than about five milliseconds of delay. The manufacturing yield of shorter lines is improved by controlling the tension on the tapes. Since there is less attenuation of signal in a shorter line, less tension is required to obtain a specified output. With less tension, the temperature sensitivity is improved.

Although the invention has been discussed in connection with a torsional mode sonic delay line, it is evident that the invention has application in general to magnetostrictive metallic tapes or wires and coil transducers of the general kind discussed where it is possible to apply tension to the tapes to control or maximize the gain as herein taught.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a sonic delay line including a wire for transmitting torsional stress waves, a pair of elongated tapes of magnetostrictive metal for transmitting longitudinal stress waves respectively connected to diametrically opposite points on the periphery of the wire and extending therefrom in spaced relation, a transducing coil supported about each of said tapes at an equal distance from said wire, means for connecting said coils in a circuit for substantially simultaneous operation, a bias magnet for producing a biasing magnetic field which acts on the portion of the tapes within the coils, a damping assembly for the tapes, free end portions of the tapes being threaded through the coils and secured in the damping assembly, and a metallic bracket on which are mounted the tapes and the portion of the wire to which the tapes are connected;

said tapes having a predetermined tension selected to control the gain of the delay line over a range of ambient temperatures, the metals of which the metallic bracket and magnetostrictive tapes are made have similar coefficients of expansion, and the magnetostrictive metal of which the tapes are made has been annealed under predetermined conditions selected to control the gain of the delay line.

References Cited

UNITED STATES PATENTS

| | | | |
|---|---|---|---|
| 3,011,136 | 11/1961 | Scarrott | 333—30 |
| 3,177,450 | 4/1965 | Tzannes | 333—30 |
| 3,265,996 | 8/1966 | Wiseman | 333—30 |

HERMAN K. SAALBACH, Primary Examiner

C. BARAFF, Assistant Examiner

U.S. Cl. X.R.

333—71